Figure 1:
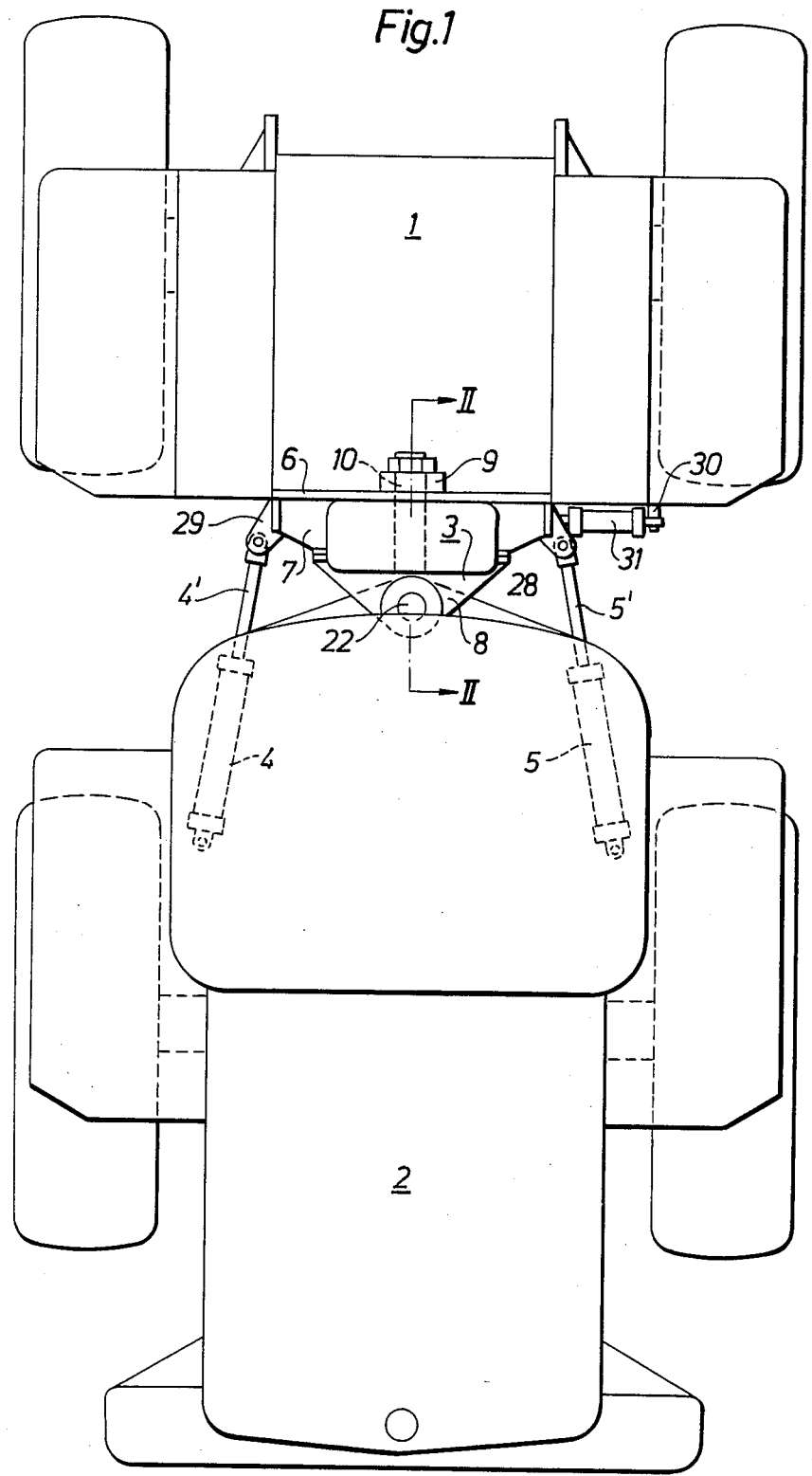

United States Patent [19]

Bas

[11] Patent Number: 4,545,454
[45] Date of Patent: Oct. 8, 1985

[54] ARRANGEMENT IN VEHICLES WITH ARTICULATED STEERING

[75] Inventor: Olov A. Bas, Hudiksvall, Sweden

[73] Assignee: Hudiksvalls Mekaniska Aktiebolag, Hudiksvall, Sweden

[21] Appl. No.: 510,758

[22] Filed: Jul. 5, 1983

[30] Foreign Application Priority Data

Jul. 9, 1982 [SE] Sweden ............................. 8204262

[51] Int. Cl.$^4$ .............................................. B62D 15/00
[52] U.S. Cl. ..................................... 180/139; 180/134
[58] Field of Search ........................ 180/139, 136, 134

[56] References Cited

U.S. PATENT DOCUMENTS

| 3,484,843 | 12/1969 | Martin | 180/139 |
|---|---|---|---|
| 3,521,720 | 7/1970 | Korotkin | 180/136 |
| 3,912,300 | 10/1975 | Bryan, Jr. | 180/139 |
| 4,111,273 | 9/1978 | Blackburn et al. | 180/139 |
| 4,281,848 | 8/1981 | Youngers | 280/494 |
| 4,290,622 | 9/1981 | Horvath | 280/400 |

FOREIGN PATENT DOCUMENTS 1267773  3/1972  United Kingdom .

Primary Examiner—Joseph F. Peters, Jr.
Assistant Examiner—Donn McGiehan
Attorney, Agent, or Firm—Kurt Kelman

[57] ABSTRACT

The invention comprises an arrangement in vehicles with articulated steering, where a vehicle part (2) is connected via a conventional articulated steering hinge (22,25) to an intermediate part (7). Steering means such as hydraulic cylinders (4,5) are connected between said vehicle part (2) and intermediate part (7), which is pivotably connected to a forward part (6) attached to the other vehicle part (1). The intermediate and forward parts are furthermore kept together by gliding means (12–19) permitting given pendular movement, said movement being in a plane substantially at right-angles to the steering plane.

5 Claims, 5 Drawing Figures

ARRANGEMENT IN VEHICLES WITH ARTICULATED STEERING

Traction consisting of two vehicle parts, each including a pair of wheels fixedly mounted in relation to the respective vehicle part, are known. Both parts are joined together by one or more linkage systems, the vehicle being steered by mutual relative turning of the parts in the horizontal plane. There are a number of problems in respect of the coupling between the vehicle parts. There is the question of accomplishing turning in the horizontal plane, and this would be comparatively simple to provide an answer to, but for the fact that the vehicle does not travel on even ground all the time. In uneven terrain one vehicle part tends to assume a leaning attitude in relation to the other, and to prevent severe bending stresses in the steering hinge joint, it is necessary to take measures to provide certain degrees of freedom, i.e. mutual relative turning of the vehicle parts about a substantially horizontal axis which is, of course, at right-angles to the steering axis. There are a number of designs on the market, and there are also many patents relating to the solution of problems concerned with this type of steering for example U.S. Pat. Nos. 3,912,300, 4,281,848, and 4,290,622. These patents relate to designs where a certain amount of free, relative movement between the vehicle parts is permitted which requires the mounting of the hydraulic cylinders providing the turning movements between the vehicle parts to be pivotable, resulting in operational drawbacks and design problems. The coupling between the two vehicle parts is moreover complicated.

The present invention has the primary object, of solving the aforementioned problems, and provides an arrangement which is relatively simple.

The invention will now be described in detail with reference to an embodiment illustrated on the accompanying drawings, where:

FIG. 1 is a top view, schematically illustrating a tractor having articulated steering.

Figure 2:
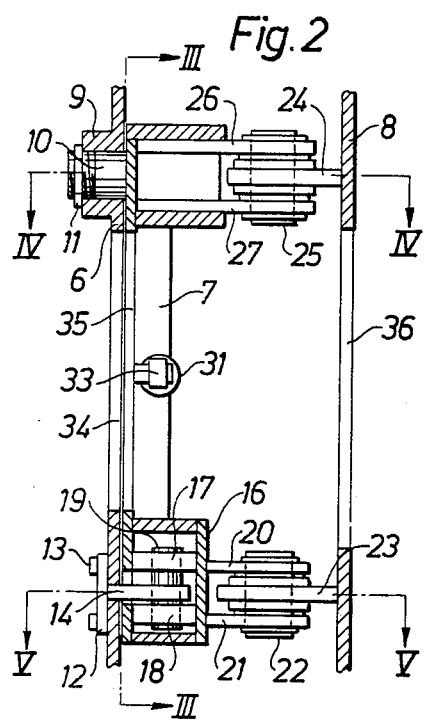
Figure 3:
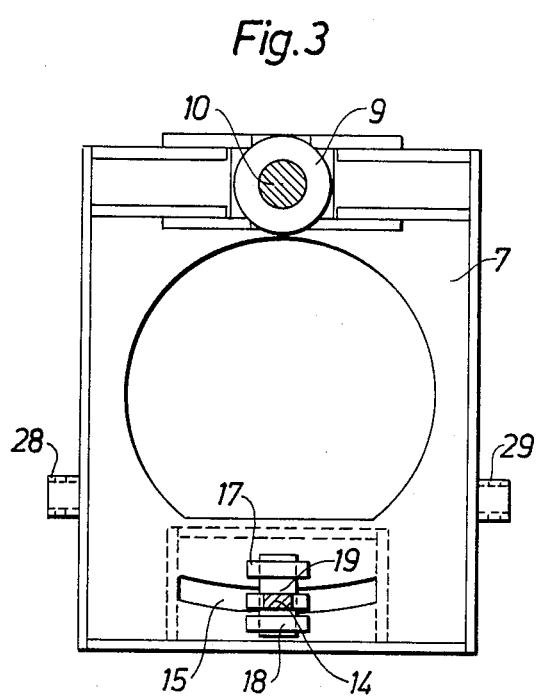
Figure 4:
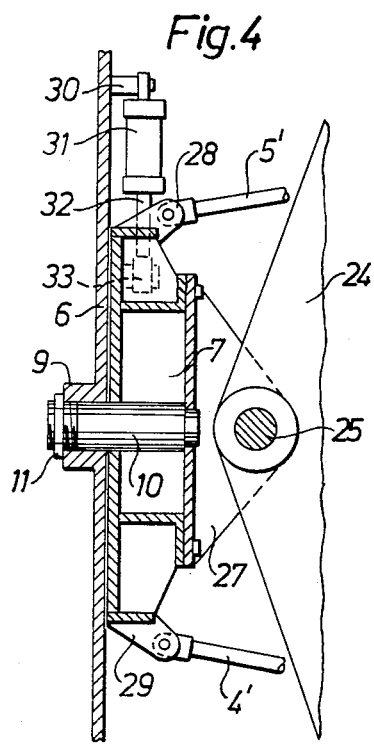
Figure 5:
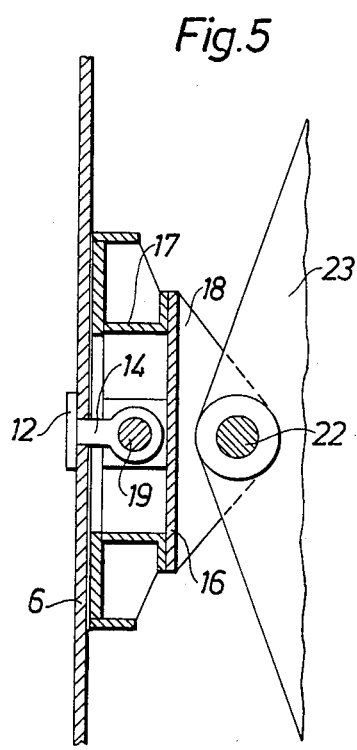

FIG. 2 is a section along the line II—II in FIG. 1.
FIG. 3 is a section along the line III—III in FIG. 2.
FIG. 4 is a section along the line IV—IV in FIG. 2.
FIG. 5 is a section along the line V—V in FIG. 2.

The tractor illustrated in FIG. 1 comprises a forward vehicle part 1 and a rear vehicle part 2. The parts are connected to each other by a joint generally denoted by 3, and steering the vehicle is accomplished by two hydraulic cylinders 4,5 mounted between parts 1 and 2. Steering is controlled from the tractor driving cabin in a conventional manner (not shown).

As shown particularly in FIG. 2, the joint comprises three main parts, the forward part 6, intermediate part 7 and rear part 8. The forward part 6 is rigidly attached to the forward vehicle part 1. The upper portion of part 6 is formed with a bearing 9 for accommodating a journalling pin 10 fastened to the intermediate part 7. The pin 10 is locked against displacement by a circlip 11 on the portion of the pin projecting from the bearing 9. The lower portion of part 6 is provided with a means comprising a plate 12 fastened to part 6 with screws 13. Attached to the plate and at right-angles to it there is a plate or tongue 14 projecting into an arcuate slot 15 in the lower portion of the intermediate part 7. A box-like structure 16 surrounds slot 15 and encloses two gliding bodies 17,18 coacting with the tongue 14 connected thereto by pin 19. The members 12–19 thus form a combined connection and retention means. With the aid of the illustrated arrangement, the intermediate part 7 may thus pivot about the pin 10, with the gliding bodies 17,18 gliding along the inner walls of the box structure 16. The pivoting movement is limited by the ends of the slot 15 or separate stops (not shown) or the gliding bodies 17,18 coming against the end walls of the structure 16. The structure 16 has two fins 20 and 21 carrying a journalling pin 22, constituting a portion of the hinging shaft associated with the steering apparatus. A tongue 23 is disposed between fins 20,21 pin 22 passes therethrough. The tongue is attached to the lower portion of the part 8. This part is rigidly attached to the vehicle part 2, similar to the rigid attachment of part 6 to the vehicle part 1. The upper portion of part 8 carries a further tongue 24 accommodating pin 25 which is coaxial with pin 22 and fastened in two plates 26,27 which are in turn rigidly attached to the intermediate part 7 in the vicinity of journalling pin 10. At each side, the intermediate part 7 is provided with a lug 28,29 constituting an attachment for the respective piston rod end 4',5' of the hydraulic cylinders 4,5. At one side, the part 6 has a pivot pin 30 for mounting a hydraulic cylinder 31, the piston rod 32 thereof being pivotably mounted on a pin 33 at an edge portion of the intermediate part 7. This hydraulic cylinder is provided for damping the oscillating movements between part 6 and parts 7 and 8 together. Parts 6,7 and 8 are central cutouts 34,35 and 36, respectively. These cutouts are substantially in register and are intended for the passage of hydraulic lines and cardan shafts extending between the vehicle parts 1 and 2.

When the vehicle is steered by operating the hydraulic cylinders 4 and 5, both vehicle parts will turn about the axis of the hinge formed alia by the pins 22 and 25. However, when the ground is uneven, one vehicle part will tend to lean in relation to the other, and there will be an oscillating movement between parts 6 and 7, i.e. the pin 10 will turn in the bearing 9. This means that there will be relative movement between the gliding bodies 17,18 and the box structure 16, although parts 6 and 7 will be kept together by the retention means 12,14,19. Violent oscillations that may occur will be absorbed by the hydraulic cylinder 31. In practice, however, two symmetrically placed cylinders should be used. It should be noted here that irrespective of the amount of swing occurring within given limits between the vehicle parts, the hydraulic cylinders 4,5 and their piston rod portions 4',5' will never alter their positions in the horizontal plane, since part 7 cannot turn in relation to part 8, other than about the hinging axis of pins 22,25. There is no out-of-line action at all between the vehicle parts during steering, and cylinders 4,5 will remain in their given plane of operation. Separating the two vehicle parts is also extremely simple. The pin 19 is disengaged from tongue 14 through an unillustrated opening in the box structure 16, after which the circlip 11 is removed, and then the joint 33 to the hydraulic cylinder 31. Both vehicle parts may then be moved away from each other. This simple uncoupling and corresponding coupling procedure results in large practical advantages in conjunction with inspection or exchange of parts.

Various embodiments may naturally be envisioned within the scope of the invention. What is essential is that the parts forming the steering hinge itself, i.e. parts 7 and 8 in the illustrated case, which constructionally constitute a unit, form a constructional unit in relation to the joint means associated with the first vehicle part. The steering means 4,5 may thus be disposed between the appropriate parts without the need of considering angular attitudes caused by pendular movements between the vehicle parts.

I claim:

1. An arrangement for pivotally coupling two vehicle parts forming an articulated vehicle, which comprises a joint means including an intermediate part, two connections mounting the intermediate part on one of the vehicle parts for pivoting relative to the one vehicle part, the connections being spaced from each other in a vertical direction, and a steering hinge connecting the intermediate part to the other vehicle part, one of the connections comprising a journalling pin mounting and the other connection comprising a mounting means fixedly arranged relative to the one vehicle part and a gliding device arranged on the intermediate part for releasably coacting with the fixed mounting means.

2. The coupling arrangement of claim 1, wherein the joint means further includes a plate-like part fixedly mounted on the one vehicle part, the journalling pin mounting comprises a bearing arranged on the plate-like part and a journalling pin journaled in the bearing and fastened to the intermediate part, the mounting means is fixedly arranged on the plate-like part, the gliding device comprises a box-like structure affixed to the intermediate part and a gliding body adapted to glide in the box, and further comprising a fin projecting from the mounting means through an arcuate slot in the intermediate part to permit oscillating movements thereof.

3. The coupling arrangement of claim 2, wherein the steering hinge has two parts, the box-like structure constituting an attachment for one part of the steering hinge parts and the other part of the steering hinge being attached adjacent the journalling pin mounting.

4. The coupling arrangement of claim 2, wherein the one vehicle part constitutes a leading part of the vehicle, and further comprising means for damping the oscillating movements, the damping means being connected, respectively, to the plate-like part and to the intermediate part.

5. The coupling arrangement of claim 1, wherein the one vehicle part, the intermediate part and the other vehicle part define central openings.

* * * * *